United States Patent
Inada

[11] 3,901,559
[45] Aug. 26, 1975

[54] VEHICLE ANTISKID BRAKING SYSTEM

[75] Inventor: Masami Inada, Toyoake, Japan

[73] Assignee: Aisin Seiki Kabushiki Kaisha, Kariya, Japan

[22] Filed: Apr. 3, 1973

[21] Appl. No.: 347,493

[30] Foreign Application Priority Data
Apr. 7, 1972 Japan.............................. 47-35407
Jan. 31, 1973 Japan.............................. 48-11939

[52] U.S. Cl..................... 303/21 F; 303/10; 303/61
[51] Int. Cl............................................... B60t 8/02
[58] Field of Search...................... 303/21, 61–63, 303/68–69, 10, 20; 188/181

[56] References Cited
UNITED STATES PATENTS

| | | | |
|---|---|---|---|
| 3,466,098 | 9/1969 | Pieren et al. | 303/21 F |
| 3,499,689 | 3/1970 | Carp et al. | 303/20 |
| 3,556,609 | 1/1971 | MacDuff | 303/21 F |
| 3,677,608 | 7/1972 | Lewis | 303/21 F |
| 3,729,236 | 4/1973 | Okamoto et al. | 303/21 F |
| 3,740,105 | 6/1973 | Holmes | 303/21 F |

Primary Examiner—Trygve M. Blix
Assistant Examiner—Douglas C. Butler
Attorney, Agent, or Firm—Haseltine, Lake & Waters

[57] ABSTRACT

A vehicle antiskid braking system comprising a hydraulic pressure modulator on a conduit interposed between a master cylinder and a wheel braking cylinder, including a cut off valve to selectively cut off the fluid connection between the master cylinder and the wheel braking cylinder, a pressure reducer for decreasing the brake actuating fluid pressure in the wheel braking cylinder in response to a first signal from a known skid sensing and computer device, and a pressure increasing device so connected with the cut off valve as to prevent fluid pressure transmission therethrough in response to the first signal and function to increase the brake actuating pressure by pumping action thereof in response to a second signal from the skid sensing and computer device.

7 Claims, 3 Drawing Figures

VEHICLE ANTISKID BRAKING SYSTEM

BACKGROUND OF THE INVENTION

This invention relates to an antiskid system for use with a motor vehicle. More particularly it relates to a control valve device for preventing locking of the hydraulic brake system of a motor vehicle.

Known control valve devices adapted for preventing the skidding or slipping of the vehicle brakes ordinarily enable the skid preventing function by a single larger sized piston and cylinder assembly which reduces and subsequently increases the brake actuating fluid pressure at wheels once each cycle of reciprocation of the piston. This deficiency is considered as a great disadvantage and shortcoming in practice, in that it is necessary to employ a larger sized servomechanism to proportionally actuate the larger sized assembly.

SUMMARY OF THE INVENTION

A principal object of the present invention therefore is to provide a control valve device having improved smaller sized first piston and cylinder assembly and improved reservoir or pressure reducing second cylinder and piston assembly for reducing the brake actuating fluid pressure in the wheel braking cylinders.

The foregoing object and others are attained according to at least one aspect of the present invention through the provision of a method to cause the first cylinder and piston assembly to act as reciprocating pumping mechanism in increasing the brake actuating fluid pressure just immediately after the skidding ceases, while decrease of the brake actuating fluid pressure being attained by permitting the fluid to escape from the brake wheel cylinders to said pressure reducing second cylinder and piston assembly.

Thus, in the disclosed embodiment, a master cylinder, wheel braking cylinder means, conduit means to provide fluid connection between said master cylinder and said wheel braking cylinder means, skid sensing and computor means and hydraulic pressure modulator means are provided to form a vehicle antiskid braking system. The said hydraulic pressure modulator means is on the conduit means interposed between the master cylinder and the wheel braking cylinder means, including cut off valve means to selectively cut off said fluid connection between said master cylinder and said wheel braking cylinder means, pressure reducing means to decrease the brake actuating fluid pressure in said wheel braking cylinder means in response to a first signal by the skid sensing and computer means indicating a need for a reduction of the brake actuating fluid pressure, and pressure increasing means so connected with said cut off valve means as to prevent fluid pressure transmission therethrough in response to said first signal and function to increase the brake actuating fluid pressure by pumping action thereof in response to a second signal from said skid sensing and computer means.

DESCRIPTION OF THE PREFERRED EMBODIMENT

Figure 1:
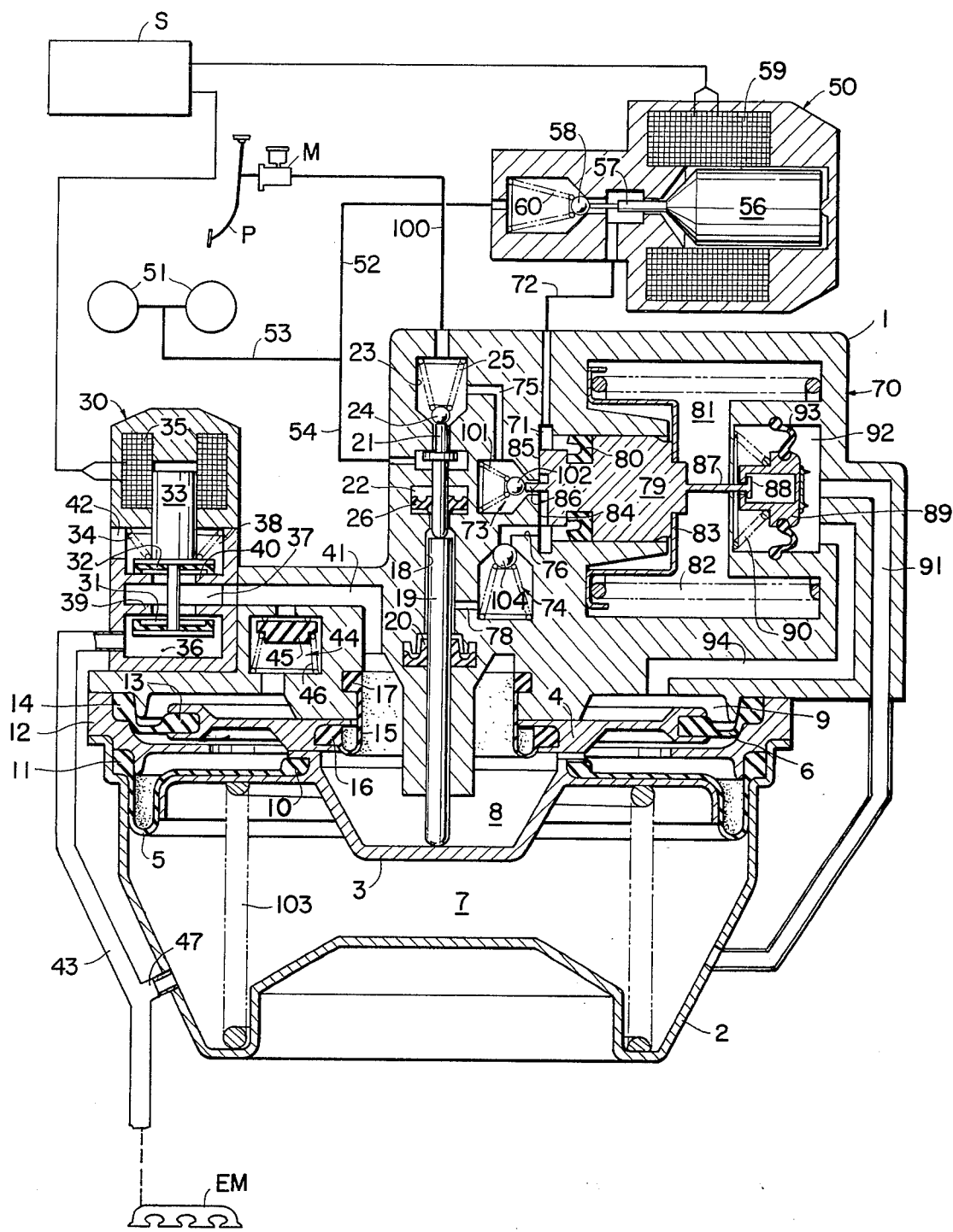
FIG. 1 is a longitudinal section view of a control valve device according to the present invention.

In this invention a brake control unit consists of body 1 and casing 2 secured together by means of bolts that are not shown. A pair of movable power walls 3 and 4 are disposed within the casing 2 and cooperate with rolling diaphragms 5 and 6 to form three chambers 7, 8 and 9. The rolling diaphragm 5 has its inner annular periphery 10 secured to the power wall 3 by being clamped between two walls of an annular groove formed in the power wall to form a seal therewith. The outer edge periphery 11 of the rolling diaphragm 5 is clamped between the casing 2 and a ring form spacer member 12 and forms a seal therewith. The second rolling diaphragm 6 has also its inner annular periphery 13 secured to the second power wall 4 in the same manner as that of the first rolling diaphragm 5 and the outer edge periphery 14 is clamped between the ring form spacer member 12 and the body 1 and forms also a seal therewith. The second power wall 4 has additionally another rolling diaphragm 15 the lower end annular periphery 16 of which is secured to the power wall 4 by being clamped between walls of an annular groove formed in the inner periphery of the power wall 4 in sealing relation therewith. The upper end annular periphery 17 is secured to the body 1 by being clamped between walls of an annular groove formed in the body to form seal therewith.

A pump cylinder 18 having a piston 19 reciprocable therein is formed in the wall of the body. The piston 19 has an annular seal 20 in slidable relation therewith to separate the cylinder from the chamber 8. The piston 19 is sealed against external leakage by the U-shaped seal 20 seated in an annular groove in the body wall. The piston 19 is upwardly moved by the power wall 3 as will be discussed as the description proceeds. The piston 19 has its upper end normally in abutment relation with the lower end of a plunger rod 21 slidably received within a chamber 22 in the wall of the body 1 in alignment with the cylinder 18. As will be seen, the chamber 22 has its two parts diametrically reduced slidably to suit the plunger rod 21. The diametrically reduced portions of the chamber 22 have one or more axially extending grooves for passage of fluid to the valve chamber 23 in a manner hereinafter described. The valve chamber 23 provides at its lower frust conical inner surface end a seat for the ball valve 24 normally spring biased to the conical seat by the compression spring 25. The plunger rod 21 is sealed against leakage from the chamber 23 by a U-shaped ring seal 26 seated in an annular groove portion of the chamber 22. It should be noted that the seal 26 does not separate the chamber 22 from the cylinder 18 against the fluid pressure applied from the cylinder 18 to the chamber 22.

An electro-magnetically operable valve member 30 has a pair of valve heads 31 and 32 both being integral with the same core 33 which is caused to move upwardly by magnetic attraction against the restoring spring 34 when a coil 35 is energized. The valve member 30 has a series of three chambers 36 to 38. The said valve heads 31 and 32 are so spaced relative to each other that two walls 39 and 40 by which said three chambers are separated are together interposed between the heads in a manner such that their outside opposed faces may provide valve seats for the valve heads 31 and 32 to alternately seat them. The said two walls 39 and 40 have a hole and the stem of the two heads passes through the holes in spaced relation to provide a passage between the three chambers 36 to 38 for the air. The middle chamber 37 connects via path 41 with the said chamber 8. The valve chamber 36 is communicated to the manifold EM of an engine via conduit 43 for supply of vacuum to the chambers. The valve chamber 38 has a port 42 to always connect the chamber with the atmospheric pressure. A check valve 44 is provided between the middle chamber 37 and the said chamber 9, the valve element 45 being normally caused to seat by its restoring spring 46 so that the valve element may be in the position in the view when vacuum is on both sides of the valve element. The atmospheric pressure may be transmitted from the chamber 38 via chamber 37 and valve 44 into the chamber 9. The chamber 7 is also communicated via port 47 with the said manifold EM through said conduit 43. A second electro-magnetically operable valve member 50 is in fluid connection with wheel brakes 51 by means of conduits 52 and 53 and further with valve chamber 22 via conduit 54. A core 56 has a stem 57 extending therefrom. The extremity end of the stem 57 is juxtaposition to a ball valve element 58 normally leaving thereof seated by spring 60. When the coil 59 is energized the core 56 is caused to move leftwardly by magnetic attraction for unseating the ball valve element 58 against the spring 60. The unit is further provided with reservoir means 70 within which a reservoir chamber 71 is connected via conduit 72, the said valve 50 and conduits 52 and 53 with the wheel brakes 51. The reservoir chamber 71 is further connected via check valve 73 and conduit 75 with the said valve chamber 23 and still further connected via conduit 76, check valve 74 and conduit 78 with the said cylinder 18. Within the reservoir chamber, a piston 79 is slidable having an annular seal 80 to fluid-tightly separate the reservoir chamber 71 from its chember 81 opposite to the chamber 71. A compression spring 82 is retained between the bottom of the chamber 81 and a cage 83 which receives therein the back end of the piston 79 normally to urge the piston to a stopper face 84 of the chamber 71. One or more projections 85 are formed on the opposed end face of the piston 79 so as to provide a space between the stopper face 84 and the end face of the piston 79. A first stem 84 extends from the piston 79 so as to normally unseat the ball 102 of the check valve 73 against its restoring spring 101 as shown in the view. Another stem 87 extending oppositely from the piston 79 is enlarged as at 88. The stem 86 is in freely slidable relation with a hollow valve element 89 and the enlarged portion 88 is within the hollow space of the element 89 to cause valve element 89 to be unseated by the superior strength of the spring 82 over a light spring 90 to open the passageway 91 from the chamber 92 to the said chamber 7. A rolling diaphragm 93 has its inner annular periphery secured to the valve element 89 by being clamped by walls of an annular groove formed on the periphery face of the element to form a seal therewith. The outer edge periphery of the rolling diaphragm 93 is clamped between walls of a ring groove formed in internal face of the chamber 92 to provide a seal therewith so that the chamber 92 is separated from the chamber 81. The chamber 92 is also connected with the chamber 9 through a path 94. As will be seen at upper left portion of FIG. 1, the known conventional brake master cylinder M is connected via conduit 100 with the said chamber 23 to transmit the braking fluid pressure into the chamber 23, on brake application by depressing the pedal P by the operator. The known skid sensing and computor means S is in electrical connection as shown by the heavy line in the Figure, with the both coils 35 and 59 to energize thereof on or just prior to locking of the brake drum or disk of a motor-vehicle wheel.

In operation, the individual parts of the control unit are in their positions in FIG. 1 immediately before the depression of the pedal P by the driver.

When the operator depresses the brake pedal P, the fluid pressure exerted in the master cylinder M is transmitted via conduit 100, chambers 23 and 22, conduits 54 and 53 into the brake wheel cylinders 51, thus applying the braking force to the wheel brakes. Upon or just prior to the the locking of the motor vehicle wheels, a signal indicating need for reduction of brake pressure will be applied to the coil 35 causing it to unseat the head 32 and to seat the head 31, at which time atmospheric pressure will be permitted to enter into the chamber 8 via the port 42, chambers 38 and 37 and path 41 while the passage from the chamber 8 to the engine manifold via the path 41, chamber 36 and conduit 43 is blocked. The atmospheric pressure is also applied into the chamber 9 through the port 42, chambers 38 and 37 and then past the check valve 44. The atmospheric pressure within the chamber 9 is sealed against external leakage by a valve element 45 and a spring 46 of the check valve 44. It should be noted that vacuum is accordingly on the under side of the power wall 3 and atmospheric pressure is on the upper side of the wall. The power wall is displaced downwardly by a pressure differential so that the piston 19 is also displaced downwardly by the spring 25 through the ball 24 and in turn by the plunger rod 24. The ball 24 is thence seats to block the passage from the master cylinder to the brake wheel cylinders 51 so that thereafter transmission of the fluid pressure in the master cylinder to the brakes is cut off.

While on the other hand another or second coil 59 is also energized in response to the same first signal from the skid sensing and computer mechanism S. The core 56 is displaced to the left in the view to cause the ball 58 to unseat, thus opening the passage between the wheel cylinders 51 and the reservoir 71, via conduits 53 and 52, ball 58 and conduit 72. The spring 82 of the reservoir valve means 70 is so calculated in design as to be overcome by an braking fluid pressure within the master cylinder to be applied to piston 79. The piston 79 is displaced toward the right when the valve 58 is unseated as above, and the fluid pressure is applied to reservoir chamber 71 from the master cylinder M. The fluid pressure is thus discharged from the wheel brake cylinders 51 to the reservoir chamber 71 via conduits 53 and 52, valve 58 and conduit 72. The braking force applied to the brake drum or the disk of the brake of a motor vehicle wheel is therefore reduced to prevent the wheel from locking, skidding or slipping of the vehicle being thus obviated.

At the time of the displacement of the piston 79, the valve element 89 of the reservoir means 70 is allowed to seat and thence to close the passage from manifold EM to the chamber 92 through the chamber 7, conduit 91. On the other hand the chamber 9 is filled with the atmospheric air through the check valve 44. This is of importance to obtain the desired result of the invention as will be discussed as the description proceeds.

When the skid ceases the second signal is applied from the computer means to the coil 59 to de-energize thereof. The core 56 returns on such de-energization to its retracted position as shown in FIG. 1. Fluid communication between the brake wheels 51 and the reservoir 70 is thus blocked, but the piston 79 is still ramains at its acting position to hold the valve element 89 in the seated position. The chamber 92 is accordingly separated from the manifold EM. This will be understood from the assumed fact that the brake pedal is still under depression by the operator and the fluid pressure in the master cylinder M is still applied into the valve chamber 73 causing the ball 102 to seat. The reason why the piston 79 should be in such position will be described in relation to other associated parts.

At the time the coil 59 is de-energized, the other coil 35 is applied a square-wave potential by current flow from the sensing and computer mechanism S and as a consequence there is produced a series of magnetic pulses of corresponding frequency at the coil. The core 33, namely a pair of valve heads 31 and 32 initiate reciprocation of corresponding frequency by magnetic atraction. During such reciprocation, the chamber 8 is alternately in fluid connection with the engine manifold and the atmosphere through the passage from the chamber 8 via path 41, chambers 37 and 36 and the conduit 43 to the manifold and the other passage from the chamber 8 via path 41, chambers 37 and 38 and the port 42 to the atmosphere. A pressure differential is intermittently produced between the both sides of the wall 3 by such reciprocation of the valve heads 31 and 32, reciprocation of the wall 3 being thus resulting in corresponding frequency. It will be noted that the chamber 7 is always in vacuum connection with the manifold. The piston 19 accordingly reciprocates in corresponding frequency. The upper end of reciprocation is so determined for the piston as to not to cause the ball 24 to unseat through the plunger rod 21. It was to obtain this condition that the valve element 89 still remains seated and the chamber 9 still remains filled with the atmospheric air to urge the wall 4 downward to the spacer member 12 for the provision of stopper means to the reciprocating wall 3. It should be noted that the check valve element 45 seals the chamber 9 against external leakage once the atmospheric pressure has been applied into the chamber therethrough.

A pumping function is effected from the reciprocation of the piston 19 to thereby transfer a quantity of fluid from the reservoir chamber 71 to the brake wheel cylinders 51 through path 76, check valve element 104, path 78, chambers 18 and 22 and conduits 54 and 53. The most significant feature of the invention is that the high frequency reciprocation of the piston may rapidly repressurizes the brake wheel cylinders 51 to obviate a useless travel of the vehicle throughout the braking action. The provision of the piston 19 and its associated parts may be found beneficial to be substituted for the larger sized piston and cylinder assembly usually employed in the conventional control device, for the purpose of substantial saving the entire size of the device and accordingly the manufacturing costs.

After the completion of the re-pressurization, the coil 35 is de-energized on the cease of the square wave potential of the computer. The individual parts of the valve means 30 returns to their original positions shown in FIG. 1. Upon such completion, the piston 79 is also displaced to the left as shown in the view causing the valve element 89 to unseat. The chamber 9 thus becomes connected with the vacuum manifold via path 94, chamber 92, conduit 91, chamber 7 and path or conduit 43. The vacuum is thus on the both sides of the upper wall 4 and the other wall 3 respectively so that the both walls return to their corresponding retracting positions shown in the view. As a result, the piston 19 is upward displaced by the wall 3 which is normally urged to the upward movement. The valve 24 is thereby unseated through the plunger rod 21. Pressurized fluid is thereby again permitted to be applied to the cylinders 51, assuming that the pedal is under continuous depression by the operator. One cycle of skid preventing function is thus completed.

It should be noted that the check valve 73 is always closed in the normal braking and subsequent possible skid preventing mode of operation. In other words, the check valve is closed a little while after the initiation of the application of fluid pressure from the master cylinder M through the conduit 100, chamber 23 and conduit 75 to the check valve 73, and thereafter it is not opened until the braking pedal P is released from the operator's foot. By provision of the conduit 75 and check valve 73 the piston 79 is caused to rightward slightly move every time the braking pressure is exerted within the master cylinder M. There is no reason except for the sake of prevention of adhesion of the piston 79 why the conduit 75 and the check valve 73 should be provided. After completion of re-pressurization of the brakes the reservoir piston 79 returns to the left so as to unseat the valve element 89 but not to open the check valve 73 unless the pedal P is released.

Figure 2:
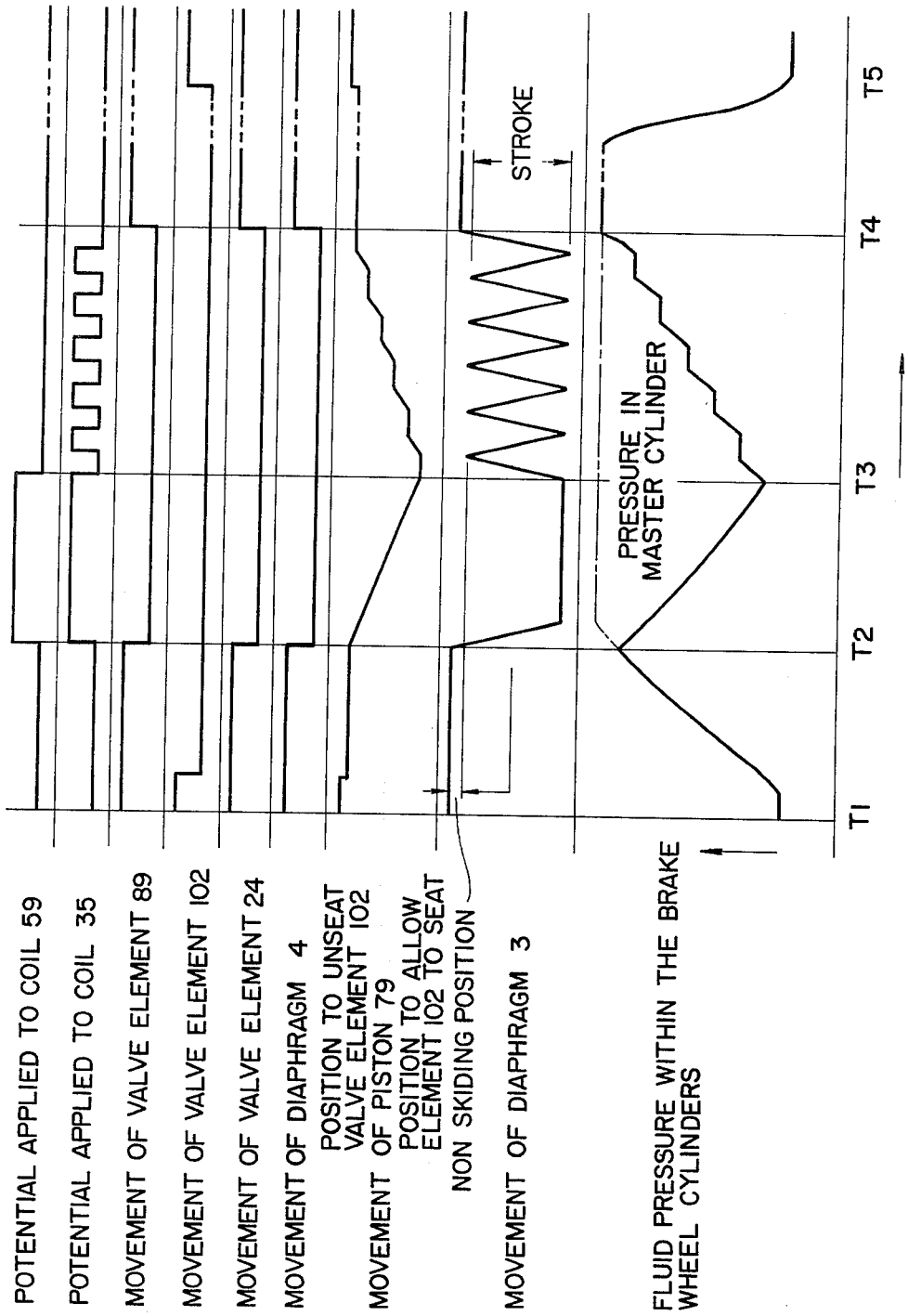
FIG. 2 is a graph showing timed relation between individual parts of the embodiment of FIG. 1.

The operation of the device of the present invention will be more readily understood from the following description made with reference to FIG. 2, in which is illustrated timed relation of the braking pressure in the wheel cylinders 51 with other associated parts thereof. The abscissa represents successive steps in one cycle of skid preventing mode of operation. During T1 - T2 step, the fluid pressure in the wheel cylinders 51 is increased up to the usual level sufficient to initiate the braking action. During the second step T2 - T3 the skid prevention is performed and brake actuating pressure in the cylinders 51 is reduced as will be seen from the heavy line in the graph whereas fluid pressure in the master cylinder M is increased up to a level indicated in the dotted line. During the third step T3 - T4, the square wave potential is applied to coil 35 and the coil 59 is de-energized, thus resulting fluttering motion of the power wall 3 followed by increase of brake actuating pressure in the wheel cylinders 51 in successive steps. During the step T 4 - T5, the device restores to the normal mode of operation. It should be noted that necessary number of the cycles are repeated until the skid ceases.

Figure 3:
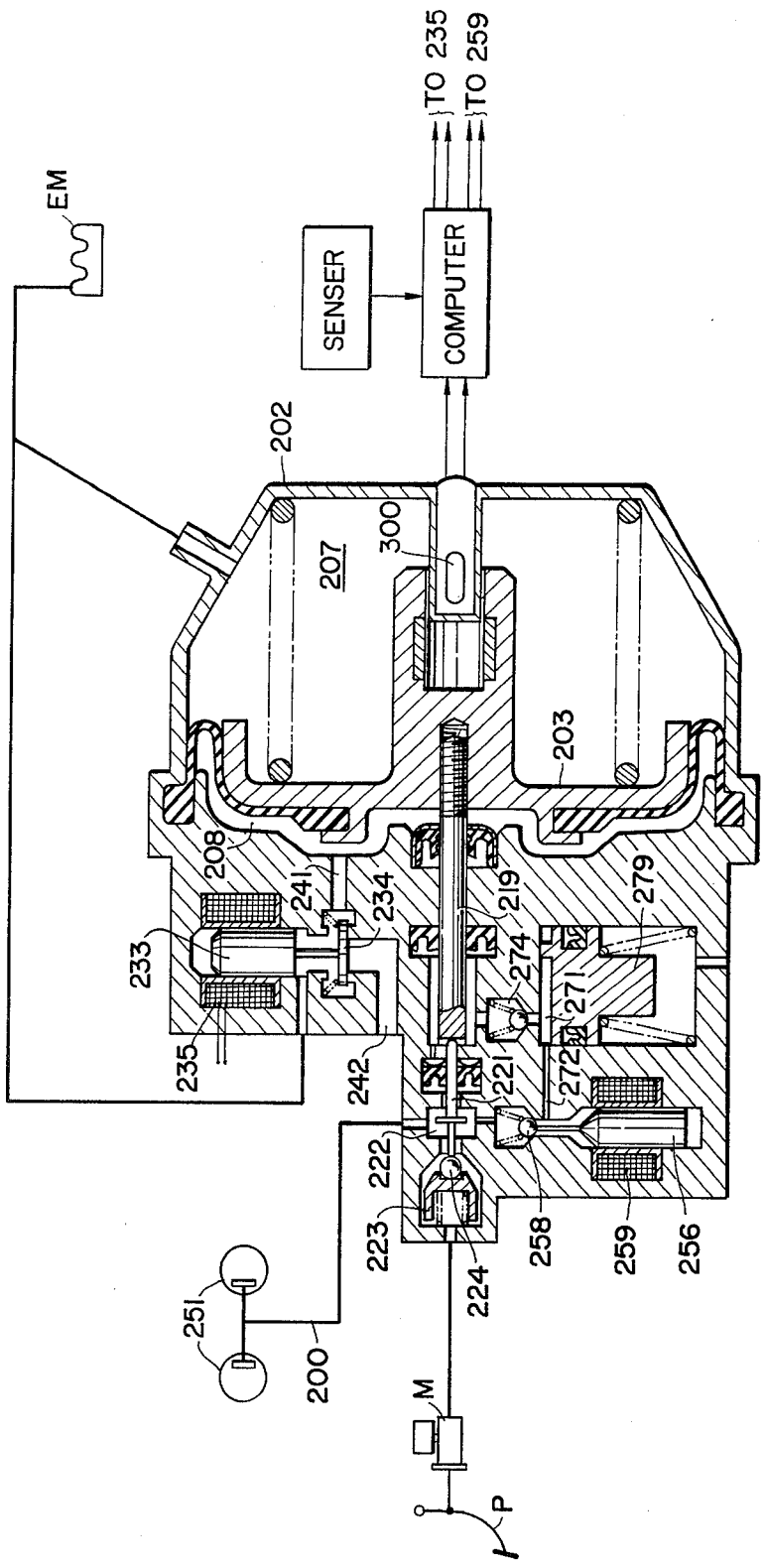
FIG. 3 is a view similar to that of FIG. 1 showing another embodiment of the invention.

FIG. 3 of the drawing shows my invention embodying a single diaphragm device. Parts which are the same as those shown in FIG. 1 are given the same number in a 200 series. The operation of the device in FIG. 3 is similar in principle to that already described.

In normal braking action, the fluid pressure is supplied from the master cylinder M to the wheel brake cylinders 251 through the valve chamber 223, chamber 222, and conduit 200. Upon or just prior to locking of the brake, the coils 235 and 259 are both energized to move corresponding valves. On the left side of the power wall 203 is applied atmospheric pressure through the port 242, valve 234 and conduit 241 whereas on the opposite side thereof is continuously vacuum so that the pressure differential is produced between the both sides of the wall. The wall 203 is moved to the right upon such pressure differential. The valve element 224 accordingly seats to cut passageway from the master cylinder M to the wheel cylinders 251 and simultaneously fluid pressure within the wheel cylinders 251 is permitted to discharge into the reservoir chamber 271 through conduit 200, chamber 222 and valve 258 and conduit 272. The force applied to the brake of the wheel is thus reduced so as to obviate skidding of the wheel. Such energization of the both coils takes place upon the application thereto of the first signal from the computor in similar manner described.

When the skid ceases, the computer produce a signal indicating need for immediate de-energization of the coil 259. Upon de-energization of the coil 259 the ball 258 is caused to seat for cutting off the passage from the cylinders 251 to the reservoir chamber 271. Throughout a determined period immediately after the cease of the skidding, the computor produces further signal for the coil 235 to energize upon provision of input from a reed switch 300 mounted on the wall 203. A known cooperation member (not shown) for the reed switch is in juxtaposition to the path of returning travel of the reed switch. When the reed switch approaches the cooperation member on the first returning travel of the wall 203, the signal indicating energization of the coil 235 is produced by the computor on receiving the input provided by the approach of the reed switch. The wall 203 thereby again travels back toward the right leaving the ball 224 seated. This is repeated during the period. The reciprocation of the wall 203 is thus effected until re-pressurization of the wheel brake cylinders 251 is completed. After the period terminated, the production of such signal ceases and the wall returns to the left rest position causing the reed switch to pass past the cooperation member without providing the input to the computor. The ball 224 is thus unseated to permit the pressure fluid to enter into the wheel brake cylinder 251. The foregoing is one cycle of skid prevention operation.

What is claimed is:

1. A vehicle antiskid braking system comprising:
a master cylinder in which a fluid pressure is exerted to apply thereof to the brakes;
wheel braking cylinder means;
conduit means to provide fluid connection between said master cylinder and said wheel braking cylinder means;
skid sensing and computer means for producing a first signal indicating a need for a reduction of the brake actuation fluid pressure and a second signal indicating a need for an increase of the brake actuating fluid pressure within said wheel braking cylinder means;
hydraulic pressure modulator means on said conduit means interposed between said master cylinder and said wheel braking cylinder means, including cut off valve means to cut off said fluid connection between said master cylinder and said wheel braking cylinder means in response to said first signal, pressure reducing means to increase total capacity of said conduit means between said pressure modulator means and said wheel braking cylinder means in response to said first signal thereby decreasing the brake actuating fluid pressure in said wheel braking cylinder means, and pressure increasing means to increase said brake actuating fluid pressure in said wheel braking cylinder means in response to said second signal by pumping fluid into said wheel braking cylinder means while said pressure reducing means being in its normal rest position;
said pressure increasing means including;
first electromagnetically operable valve means;
a servomechanism;
a pressure increasing piston and cylinder assembly;
said first electromagnetically operable means being in fluid connection with said servomechanism to supply vacuum or atmosphere pressure to said servomechanism in response to said first or second signal and said pressure increasing piston and cylinder assembly being connected to said servomechanism so as to close said cut off valve means in response to said first signal while on the other hand function as a reciprocating pump in response to said second signal thereby the brake actuating fluid pressure is increased in said wheel brake cylinder means.

2. The vehicle antiskid braking system, as recited in claim 1, wherein said servomechanism includes;
case;
a diaphragm power wall dividing said case into a first and second chambers and is connected to said pressure increasing piston;
said first chamber being in fluid connection with said first electromagnetically operable valve means and said second chamber being in fluid connection with said vacuum source.

3. The vehicle antiskid braking system, as recited in claim 2, wherein said first electromagnetically operable valve means normally permits to supply vacuum therethrough to said first chamber while permits to supply atmospheric pressure to said first chamber in response to said first signal so that a pressure differential is produced between both sides of said power wall to thereby move said diaphragm whereby said pressure increasing piston is moved by said wall to close said cut off valve.

4. The vehicle antiskid braking system as recited in claim 3, wherein said first electromagnetically operable means permits to alternately supply vacuum and atmosphere to said first chamber in response to said second signal to thereby reciprocate said diaphragm power wall and then in turn said pressure increasing piston for increasing the brake actuating fluid pressure in said wheel brake cylinder means, and is provided with means to ensure one of the stroke ends of said pressure increasing piston at an accurate fixed position to hold said cut off valve means in its seated position during said reciprocation.

5. The vehicle antiskid braking system, as recited in claim 3, wherein said pressure reduction means includes a second electromagnetically operable valve means operable in response to said first signal and a pressure reducing piston and cylinder assembly drivenly connected to said second electromagnetically operable valve means to expand the volume of inner space of said cylinder means for permitting pressure fluid to escape from the wheel braking cylinder means and thereby reducing the brake actuating pressure at the wheels.

6. The vehicle antiskid braking system, as recited in claim 3, wherein said diaphragm power wall is provided with a reed switch, said reed switch functions to ensure reciprocation of the wall and one terminal end of stroke of said pressure increasing piston at an accurate position just prior to said cut off valve means to hold thereof in the seated position until said second signal ceases.

7. The vehicle antiskid braking system, as recited in claim 6, wherein said reed switch is electrically connected to said second electromagnetically operable valve means to permit fluid connection between said first chamber and siad atmosphere in timed relation with said second signal.

* * * * *